UNITED STATES PATENT OFFICE.

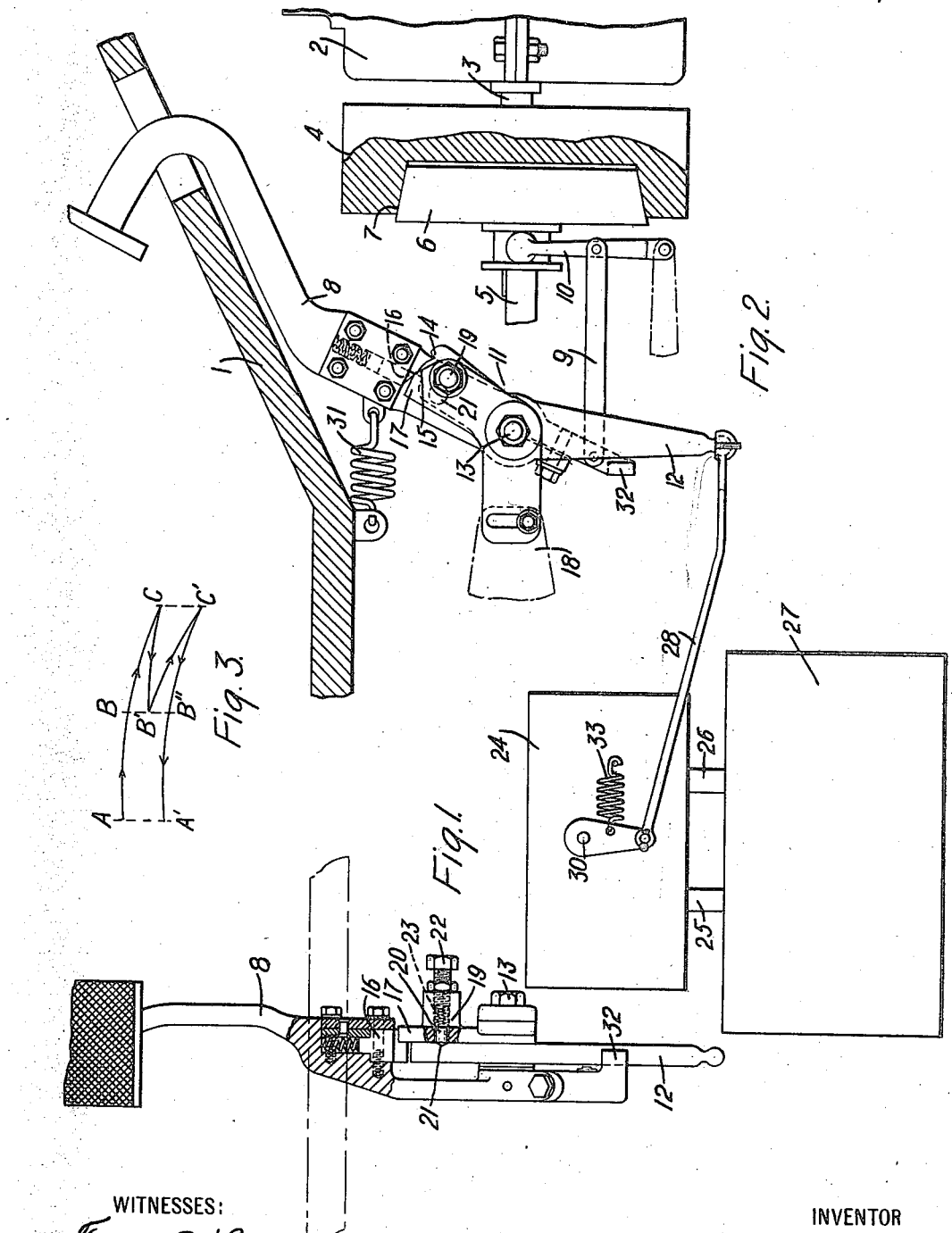

CHESTER B. MILLS, OF EAST McKEESPORT, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,159,524.          Specification of Letters Patent.        Patented Nov. 9, 1915.

Application filed August 7, 1914. Serial No. 855,555.

*To all whom it may concern:*

Be it known that I, CHESTER B. MILLS, a citizen of the United States, and a resident of East McKeesport, in the county of Allegheny and State of Pennsylvania, have invented a new and useful Improvement in Gear-Shifting Mechanism, of which the following is a specification.

My invention relates to gear-shifting mechanisms and particularly to controlling means therefor.

My invention has for its object to provide a simple and efficient time-element device for controlling the gear-shifting mechanism of an automobile or other motor vehicle.

In the operation of gear-shifting mechanisms, whether manually operable or actuated by power devices, it has been found that, if the movable gear wheels of the transmission mechanism are shifted directly from one position to another for different speed ratios, there is a material difference in the speeds of the coacting gear wheels which are to be connected. As a result, the gear wheels do not mesh readily, and the clashing of the gear teeth, which occurs under such circumstances, causes their early destruction. The injury to the gear wheels occurs because insufficient time has elapsed, between the disengagement of one pair of coacting wheels and the engagement of the second pair of coacting wheels, to permit the clutch brake to effect a decrease in speed of the movable member of the engine clutch and that part of the transmission mechanism which is connected to it. It has been found that, if sufficient time intervenes between the connections for the different speed ratios, the gear wheels to be connected have substantially the same speed ratio and their engagement may be effected without damaging them. In order to insure that the operator will allow sufficient time for the clutch brake to perform its normal function, it is essential to provide a mechanism for preventing the change from one speed ratio to another directly.

According to the present invention, I provide a time-element device which is interposed between the gear-shifting mechanism and the clutch pedal lever that is employed to actuate the gear-shifting mechanism. The time-element device is so arranged that it is necessary to reciprocate the clutch pedal to operate the gear-shifting mechanism by a step-by-step process. By reason of this mechanism, it is impossible to shift the transmission mechanism directly from one speed position to another until sufficient time interval has elapsed to permit the clutch brake to effect a considerable reduction in speed of the more rapidly rotating parts. The gear wheels may then be meshed easily and without damage to their respective teeth.

In the accompanying drawings, Figure 1 is a view, partially in elevation and partially in section, of the clutch pedal with the time-element device applied thereto. Fig. 2 is a view, similar to Fig. 1, of a portion of an automobile with my invention applied thereto. Fig. 3 is a diagrammatic view, illustrating graphically the movements of the clutch pedal in performing its several functions.

An automobile 1, only a portion of which is shown, has an engine 2, part of which is broken away. The engine 2 has a shaft 3 upon which is mounted the usual fly wheel 4. A shaft 5 is connected to the fly wheel 4 by a movable clutch member 6 that is slidably mounted on the shaft 5 and a coacting clutch member 7 that is formed in the fly wheel 4. The movable clutch member 6 is controlled by a clutch pedal lever 8 which is connected thereto by a link 9 and a yoke member 10.

A time-element device 11 comprises a lever 12, which has a pivotal support at 13 in common with the pedal lever 8. The lever 12 is provided, at its upper end, with ratchet teeth 14 and 15, which coact with a spring-pressed pawl 16 that is carried by the pedal lever 8. The pawl 16 is normally retained in an inoperative position by a stationary cam member 17 that is adjustably secured to a stationary member 18.

The lever 12 is yieldingly retained in its normal position and in an intermediate position occupied by it during its operation, by an accentuating device 19 which is mounted on the cam member 17. The accentuating device comprises a short lug 20 that is adapted to successively engage a pair of recesses 21 in the lever 12. An adjusting screw 22 controls the tension of a spring 23 which presses the lug 20 inwardly.

A gear-shifting mechanism 24, the details of which form no part of the present invention, comprises shift rods 25 and 26 which are connected to the shiftable gear wheels (not shown) of a transmission mechanism 27 of the vehicle. The transmission mechanism 27, which is shown diagrammatically, may be any of the standard transmission mechanisms in which shiftable gear wheels are moved in opposite directions to connect the engine to the transmission shaft at different speed ratios. The lever 12 is connected to the gear-shifting mechanism 24 by means of a link 28, a crank arm 29 and a shaft 30.

Normally, the various parts are in their respective positions illustrated in Figs. 1 and 2. It may be assumed that the vehicle is in operation and that it is desired to change the speed ratio at which the engine is connected to the driving wheels. The clutch lever 8 is pressed forwardly against the tension of a spring 31 to first disengage the clutch members 6 and 7. This operation occurs during that portion of the path of movement of the lever 8 represented by the line A B in Fig. 3. The pawl 16 is then in a position to engage the ratchet tooth 14 of the lever arm 12. Further forward movement of the pedal lever 8, as represented by the line B C, operates to rock the lever 12 about its pivot to return the movable gear wheel which has been shifted to its neutral position. The lug 20 then registers with a recess 21 in the lever 12 with sufficient force to retain the lever 12 in this position until it is again engaged by the pawl 16. The lever 8 is then at the limit of its forward movement, and it is necessary to allow the spring 31 to retract the lever to its mid-position, before the lever 12 can be actuated further, this portion of its movement being represented by the line C B¹. The pawl 16 is then in a position to engage the ratchet tooth 15, which has advanced to the position normally occupied by the tooth 14. The pedal lever 8 is again actuated forwardly, as represented by the line B¹ C¹, to actuate the lever 12 in the same direction and thereby effect the meshing of the gear wheels of the transmission mechanism for the desired speed ratio. The operator then permits the spring 31 to return the lever 8 to its normal position. During the path of movement represented by the line C¹ B², the gear-shifting mechanism and the lever 12 are returned toward their normal or neutral positions by a spring 33 until the lug 20 is again in engagement with the recess 21. Further return movement of the lever 8 causes an arm 32 that is integral with the lever 8 to engage the lever 12 with sufficient force to disengage the accentuating device 19 and cause the lever 12 and the gear-shifting mechanism 24 to return to their normal positions. At the end of the movement of the lever 8, represented by the line B² A¹, the various parts have been returned to their respective normal positions. The lug 20 is then in register with a recess 21, and the clutch members 6 and 7 are again engaged to connect the engine to the transmission mechanism at the desired speed ratio. In the same manner, the time-element device operates to delay the operation of the gear-shifting mechanism in changing from a higher to a lower speed ratio. For example, in changing from third speed to second speed, it is necessary to allow sufficient time either for the engine to accelerate the clutch and the gear wheel connected to it or for the car to slow down and thus reduce the speed of the transmission mechanism. The gear wheels to be meshed then have approximately the same speed and may be easily meshed.

It will be noted that I provide an arrangement whereby it is impossible to shift the movable gear wheels of the transmission mechanism directly from one speed position to another without the elapse of considerable time. This time will, ordinarily, be sufficient to permit the clutch brake to effect a reduction in the speed of the rapidly rotating parts so that the gears may be meshed readily.

I claim as my invention:

1. The combination with a gear-shifting mechanism, of means comprising a manually operable lever and a time-element device for actuating said mechanism.

2. The combination with a gear-shifting mechanism, and an actuating member therefor, of a time-element device for connecting said member to said mechanism.

3. The combination with a gear-shifting mechanism, and an actuating member therefor, of a ratchet mechanism for operatively connecting said member to said mechanism.

4. The combination with a clutch, a controlling lever therefor, and a gear-shifting mechanism, of a time-element device for connecting said lever to said mechanism.

5. The combination with a gear-shifting mechanism, of actuating means therefor comprising a step-by-step mechanism.

6. The combination with a clutch, a controlling lever therefor, and a gear-shifting mechanism, of means for connecting said lever to said mechanism and for requiring an intermittent movement of said lever to actuate said mechanism.

7. The combination with a transmission clutch, a controlling member therefor, and a gear-shifting mechanism, of means for connecting said member to said mechanism, said connecting means being so arranged as to necessitate a plurality of reciprocal movements of said member to actuate said mechanism.

8. The combination with a transmission clutch, and a gear-shifting mechanism, of means for controlling said clutch and said mechanism to progressively disengage said clutch, to actuate said mechanism by reciprocal movements and to effect the engagement of said clutch.

In testimony whereof, I have hereunto subscribed my name this 29th day of July, 1914.

CHESTER B. MILLS.

Witnesses:
R. PRUGGER,
B. B. HINES.